(12) United States Patent
Uramachi et al.

(10) Patent No.: US 6,561,021 B2
(45) Date of Patent: May 13, 2003

(54) FLOW RATE-MEASURING DEVICE

(75) Inventors: Hiroyuki Uramachi, Tokyo (JP);
Fumiyoshi Yonezawa, Tokyo (JP);
Naruki Suetake, Tokyo (JP); Ryuji Tohyama, Tokyo (JP); Tomoya Yamakawa, Tokyo (JP); Shingo Hamada, Tokyo (JP); Takeharu Oshima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/839,534

(22) Filed: Apr. 23, 2001

(65) Prior Publication Data

US 2002/0043103 A1 Apr. 18, 2002

(30) Foreign Application Priority Data

Oct. 13, 2000 (JP) ........................................ 2000-313044

(51) Int. Cl.7 ................................................. G01F 5/00
(52) U.S. Cl. ..................................................... 73/202.5
(58) Field of Search ........................... 73/202.5, 118.2, 73/204.21, 204.22

(56) References Cited

U.S. PATENT DOCUMENTS 5,381,691 A * 1/1995 Miyazaki et al. .......... 73/202.5
5,948,975 A * 9/1999 Mueller et al. ............ 73/118.2

FOREIGN PATENT DOCUMENTS

| DE | 199 13 654 A1 | 10/1999 | |
| JP | 8-219838 | 8/1996 | ............. G01F/1/68 |
| JP | 8-313318 | 11/1996 | ............. G01F/1/68 |
| JP | 10-142020 | 5/1998 | ............. G01F/1/68 |
| JP | 11-131570 | 5/1999 | ............. G01F/1/68 |

* cited by examiner

Primary Examiner—Hezron Williams
Assistant Examiner—Jewel Thompson
(74) Attorney, Agent, or Firm—Sughrue Mion, PLLC

(57) ABSTRACT

A flow rate-measuring device capable of measuring accurately a flow rate of fluid to be measured containing a drift or eddy as compared with a conventional device is provided. A flow rate-measuring passage 11 for measuring a flow rate of the fluid to be measured is constructed so that its opening area in an upstream region communicating to an inlet 111 gradually decreases from upstream to downstream. A flow rate-detecting element 31 is disposed near an outlet in the flow rate-measuring passage 11. The device is provided with a leak flow passage 18 allowing a part of the fluid which has flown in from the inlet 111 of the flow rate-measuring passage 11 to leak out of the flow rate-measuring passage 11 at a portion upstream from an outlet 112 of the flow rate-measuring passage 11, in particular upstream from a position where the flow rate-detecting element 31 is disposed.

17 Claims, 9 Drawing Sheets

FLOW RATE-MEASURING DEVICE

BACKGROUND OF THE INVENTION

1. Technical Field

The present invention relates to a flow rate-measuring device and, more particularly, to a flow rate-measuring device suitable for measuring an intake air flow rate of an engine such as internal combustion engine.

2. Background Art

FIG. 13 is a front view of a conventional flow rate-measuring device disclosed in the Japanese Patent Publication (unexamined) No. 313318/1996. FIG. 14 is a sectional view taken along the line XIV—XIV of FIG. 13. In FIGS. 13 and 14, reference numeral 10 is a flow rate-measuring device, numeral 1 is a main body of the flow rate-measuring device, numeral 2 is a circuit substrate accommodation case, numeral 3 is an electric member for measuring the flow rate, numeral 5 is a duct where fluid to be an object of flow measurement (hereinafter referred to as fluid to be measured) flows, and numeral 6 is a honeycomb. An arrow A indicates the flow direction of the fluid to be measured (this is the same in the respective drawings described below). The circuit substrate accommodation case 2 is connected with the flow rate-measuring device body 1, and the circuit substrate accommodation case 2 is attached to the duct 5 and holds the flow rate-measuring device body 1 in the duct 5. The flow rate-measuring device body 1 is comprised of a terminal holding member 13 and a flow rate-measuring passage 11 consisting of a cylinder having a bell-mouthed inlet. The electric member 3 is comprised of a flow rate-detecting element 31 consisting of a flow rate-detecting resistance 311, a temperature-compensating resistance 312, a circuit substrate 34 accommodated in the circuit substrate accommodation case 2, a terminal 35, and a connector 36. The flow rate-detecting element 31 and the temperature-compensating resistance 312 are electrically connected with the circuit substrate 34 through the terminal 35, and the circuit substrate 34 is electrically connected with the connector 36. In this manner, the flow rate-detecting element 31 and so on are operated by electric power supplied through the connector 36. The flow rate of the fluid to be measured detected by the flow rate-detecting element 31 is transformed into an electric signal, and is inputted via the circuit substrate 34 to an external receiver (not shown in the drawings). The flow rate-detecting resistance 311 is formed by putting a platinum film in the form of teeth of a comb on a ceramic substrate. The temperature-compensating resistance 312 is also formed of platinum.

In such a conventional flow rate-measuring device 10, a heating current flowing in the flow rate-detecting resistance 311 of the flow rate-detecting element 31 is controlled by a circuit (not shown in the drawings) formed in the circuit substrate 34 so that the average temperature of the flow rate-detecting resistance 311 is higher than the temperature of the fluid to be measured detected by the temperature-compensating resistance 312 by a predetermined value. The heating current supplied to the flow rate-detecting resistance 311 is detected from dependence of the resistance value of the flow rate-detecting resistance 311 on temperature and cooling effect of the flow rate-detecting resistance 311 based on the flow of the fluid to be measured, and this heating current value is inputted as a flow rate signal to the external receiver.

FIG. 15 shows a sectional view of an example of a pipe system in a case where the foregoing flowrate-measuring device 10 is used for measuring an air intake flow rate of an internal combustion engine for vehicles. In FIG. 15, numeral 6 is the honeycomb, numeral 7 is an air cleaner case, and numeral 71 is an air cleaner element arranged in the air cleaner case 7. The air cleaner element 71 is a filter composed of a nonwoven fabric or filter paper. The air cleaner element 71 catches dust in the air sucked into the internal combustion engine (not shown) to prevent dust from coming into the internal combustion engine. In the pipe system as described above, the flow rate-measuring device 10 is arranged in the downstream of the air cleaner element 71.

The air cleaner element 71 is plugged by accumulation of dust increasing with the increase of the air intake quantity due to operation of the internal combustion engine. Owing to the plugged air cleaner element 71, eddy is generated or flow velocity distribution becomes uneven in the flow of the intake air having passed through the air cleaner element 71. As a result, there is a great difference in the flow of the intake air in the upper stream of the flow rate-measuring device 10 depending upon whether it is before the air cleaner element 71 is plugged or after the element is plugged are greatly different. Even when the flow of the intake air is greatly changed, the change of the flow of the intake air is moderated by the honeycomb 6 arranged upstream from the flow rate-measuring device 10 and the bell-mouthed configuration of the flow rate-measuring passage 11 in the flow rate-measuring device 10, and consequently, value of an error in the flow rate measured by the flow rate-measuring device 10 is lowered. In this situation, the honeycomb 6 functions to remove whirl flow components such as eddy. The bell-mouthed configuration functions to contract the flow of the air flowing into the flow rate measuring passage 11 to a certain degree and reduce unevenness in the flow velocity distribution. In addition, it is certain that the cylindrical flow rate measuring passage 11 has the bell-mouthed configuration, but the function of reducing eddies is not very large. Therefore, the flow rate-measuring device 10 having the flow rate-measuring passage 11 of such a cylindrical configuration is used generally in combination with the honeycomb 6.

In recent years, under the background of increasing tendency of demanding for smaller engine rooms, the so-called plug-in type flow rate-measuring device, for example, a flow rate-measuring device disclosed in Japanese Patent Publication (unexamined) No. 219838/1996, being capable of easily attached to a duct has been proposed. However, the flow rate-measuring device disclosed in the foregoing official gazette is not provided with a special fluid passage for measuring the flow rate of the fluid to be measured like the flow rate-measuring passage 11 shown in FIG. 14 as described above. Therefore, it is difficult to attach a rectifier like the foregoing honeycomb to the flow rate-measuring device itself. This causes a problem such that the error in measuring the flow rate is increased when the air cleaner element is plugged.

In order to reduce the error in the flow rate measured by the plug-in type flow rate-measuring device, in some cases, a rectifier is attached to the air cleaner case or an intake pipe. However, in such a case, when using a rectifier with small meshes to obtain a sufficient rectification performance, pressure loss is increased, and the quantity of air possible to be taken into the internal combustion engine is limited, whereby output of the internal combustion engine is lowered. There is another problem in that the rectifier is plugged by fine dust that has passed through the air cleaner element. On the other hand, when using a rectifier with large meshes is used to solve the problem of being plugged, not only the rectification effect is lowered but further problems such as increase in thickness of a boundary layer and unevenness in friction stress occur in a flow rate detecting portion of the foregoing flow rate-measuring device due to eddy generated in the downstream of the rectifier. As a result, there arises a turbulence in the signal of a detected flow rate, and the flow rate is not detected accurately in some cases. Moreover, there is a further problem in that due to the necessity of adding any rectifier such as honeycomb to the flow rate-measuring device, cost for manufacturing the flow rate-measuring device is increased.

A flow rate-measuring device disclosed in the Japanese Patent Application No. 131570/1999 (hereinafter referred to as the prior application art) was developed by some of the inventors of the present invention in order to solve the above-discussed problems. Construction of this flow rate-measuring device is going to be described briefly with reference to FIGS. 16 and 17.

FIG. 16 is a front view of the foregoing flow rate-measuring device. FIG. 17 is a sectional view taken along the line XVII—XVII of FIG. 16. In FIGS. 16 and 17, the flow rate-measuring device 10 is attached to the duct 5 through which the fluid to be measured flows, and the flow rate-measuring device 10 has the columnar flow rate-measuring device body 1. The flow rate-measuring device body. 1 has the flow rate-measuring passage 11 for taking in and flowing a part of the fluid to be measured and the flow rate-detecting element 31 arranged in the flow rate-measuring passage 11. The flow rate-measuring passage 11 has an inlet 111 opening on convection faces opposite to the flow (the arrow A) of the foregoing fluid to be measured in the flow rate-measuring device body 1, and an outlet 112 opening on the rear side of the foregoing convection faces. An opening area (hereinafter referred to as cross section in a direction crossing the center axis of the flow rate-measuring passage 11 at right angles) of the flow rate-measuring passage 11 gradually decreases from the inlet 111 to the outlet 112.

The flow rate-measuring passage 11 shown in FIGS. 16 and 17 has a function of effectively decreasing uneven flows and eddies by contraction flow caused by the foregoing unique flow passage structure and by rectification of the fluid to be measured on the basis of the contraction flow described in detail in the specification of the prior application art, even if the fluid to be measured flowing into the flow rate-measuring passage 11 contains eddies or a flow having large unevenness in the flow velocity distribution (hereinafter referred to as drift) like a gas that has passed through a plugged honeycomb, for example.

The flow of the introduced fluid at the inlet 111 of the foregoing flow rate-measuring passage 11 is schematically illustrated in FIG. 17. That is, the fluid to be measured flowing in at the center of the flow rate-measuring passage 11 and in its vicinity as indicated by the arrow B flows toward the outlet 112 and is discharged from the outlet 112 to the outside of the flow rate-measuring passage 11. However, there exists a problem in that a part of the fluid to be measured which has flown in at ends of the inlet 111 flows backward and gets out of the inlet 111 as indicated by the arrow C. Such a backflow of a part of the fluid brings about a problem of turbulence in the flow at the inlet 111 of the flow rate-measuring passage 11 and deteriorates the rectification action based on the mentioned contraction flow due to the flow rate-measuring passage 11.

SUMMARY OF THE INVENTION

The present invention was made to resolve the above-discussed problems incidental to the foregoing prior application art, and has an object of providing a flow rate-measuring device capable of measuring a flow rate of a fluid containing any drift or eddy more accurately than the conventional measuring devices.

(1) A flow rate-measuring device according to the present invention comprises: a flow rate-measuring device body having a flow rate-measuring passage for measuring a flow rate of a fluid to be measured; a flow rate-detecting element disposed in the flow rate-measuring passage; and a leak flow passage using a part of an inlet of the flow rate-measuring passage as a leak flow passage inlet and allowing the fluid to be measured which has flown in from the leak flow passage inlet to leak out of the flow rate-measuring passage at a portion upstream from an outlet of the flow rate-measuring passage.

As a result of such construction, the fluid to be measured which has flown in at the ends of the inlet of the flow rate-measuring passage does not flow backward like the flow of the arrow C indicated in FIG. 17. But, the flow passing through the leak flow passage is discharged from its discharge port to the outside of the flow rate-measuring passage. Consequently, in the flow rate-measuring device according to the invention, a backflow occurred in the prior application art does not substantially take place, or at least the quantity of the backflow is decreased. This solves the problem of increase of turbulant flows caused by the backflow in the flow rate-measuring passage.

(2) It is preferable that an opening area in a direction crossing a center axis of the flow rate-measuring passage at right angles in the flow rate-measuring passage, at least in an upstream region communicating to the inlet of the flow rate-measuring passage, gradually decreases from the upstream to the downstream of the flow rate-measuring passage.

As a result of such construction, most of the fluid that has flown into the flow rate-measuring passage without being substantially influenced by the back flow flows toward the outlet of the flow rate-measuring passage. Meanwhile the flow is smoothly contracted according to the gradual decrease of the opening area. Therefore the flow rate-measuring device according to the invention effectively performs the rectification due to a contraction flow described in detail in the prior application art. Consequently it is possible to measure the flow rate of the fluid to be measured with less error without jointly using any rectifier even when the fluid contains any drift or eddy.

(3) A flow rate-measuring device according to the present invention comprises: a flow rate-measuring device body having a flow rate-measuring passage for measuring a flow rate of a fluid to be measured; a flow rate-detecting element arranged in the flow rate-measuring passage; and a leak flow passage using a part of an inlet of the flow rate-measuring passage as a leak flow passage inlet and allowing the fluid to be measured which has flown in from the leak flow passage inlet to leak out of the flow rate-measuring passage at a portion upstream from an outlet of the flow rate-measuring passage, wherein an opening area in a direction crossing a center, axis of the flow rate-measuring passage at right angles in the flow rate-measuring passage, at least in an upstream region communicating to the inlet of the flow rate-measuring passage, gradually decreases from the upstream to the downstream of the flow rate-measuring passage.

As a result of such construction, the same advantages as described in the foregoing (1) and (2) are obtained.

(4) It is preferable that the opening area of the inlet of the flow rate-measuring passage is 1.3 to 3 times as large as the opening area of the outlet of the flow rate-measuring passage.

As a result of such construction, the following advantages are obtained. That is, the fluid to be measured pulsates due to acceleration or deceleration of the engine, and this pulsation causes occurrence of eddy at the rear of the outlet of the flow rate-measuring passage. On the other hand, the air cleaner element is plugged more with the passage of time as it is used, and the plugged air cleaner element causes a drift in the fluid to be measured. When the opening area ratio of the inlet and the outlet of the flow rate-measuring passage remains within the above-mentioned range, it is possible to measure the flow rate withless error thereby solving both problems of the eddy and the drift.

(5) It is also preferable that the flow rate-measuring device body is a columnar body in which each of faces of the flow rate-measuring device body, where the inlet and the outlet of the flow rate-measuring passage are opened, is rectangular or almost rectangular.

As a result of such construction, the device exhibits an advantage of assisting the rectification performed by the flow rate-measuring passage by subdividing or fractionizing. the eddies contained in the fluid to be measured before flowing into the flow rate-measuring passage.

(6) It is also preferable that sides of the outlet of the flow rate-measuring passage extending in a direction of long sides of the face, where the outlet is opened, of the flow rate-measuring device body are longer than short sides of the face.

As a result of such construction, the following advantages are obtained. The fluid to be measured pulsates due to acceleration or deceleration of the engine, and this pulsation generates eddy at the rear of the outlet of the flow rate-measuring-passage as described above. This eddy may be pushed back to the outlet and block the outlet when the engine is decelerated. Since the sides extending in the direction of the long sides of the face, where the outlet is opened, of the flow rate-measuring device body are longer than the short sides of the face, the eddy cannot block the outlet. Consequently, even a big pulsation flow does not cause a problem of decrease in the flow velocity of the fluid to be measured in the vicinity of the flow rate-detecting element, and the flow rate can be measured with less error.

(7) It is also preferable that the flow rate-measuring device body is disposed in a duct of the fluid to be measured so that a center axis of the flow rate-measuring passage thereof may be substantially coincident to a center axis of the duct, and at least a part of convection faces opposed to the flow of the fluid to be measured of the flow rate-measuring device body is streamlined to reduce a flow resistance of the fluid to be measured.

As a result of such construction, the following advantages are obtained. When the convection faces are flat like the convection faces in the prior application art shown in FIGS. 16 and 17, a stagnation point is generated on the convection faces due to stemming of the fluid to be measured. Thus smooth flowing of the fluid into the flow rate-measuring passage is obstructed. However, when each of the convection faces is streamlined like a bow, the stemming and the stagnation point due to the stemming are not generated. Thus a steady flow is assured and the flow rate is measured with less error.

(8) It is also preferable that the inlet of the leak flow passage is located at an end portion of the inlet of the flow rate-measuring passage, and an outlet of the leak flow passage is located upstream from a portion where the flow rate-detecting element is disposed.

(9) It is also preferable that an opening area of the leak flow passage in a .direction crossing a center axis of the leak flow passage at right angles gradually decreases from the inlet to the outlet.

As a result of such construction, especially in the aspects of (1) or (3), when gradually decreasing the opening area of the leak flow passage in the direction crossing the center axis of the leak flow passage at right angles from the inlet to the outlet, the mentioned function of preventing back flow is more improved. At the same time, the rectification action due to a contraction flow in the flow rate-measuring passage is more improved.

(10) It is, also preferable that portions of the flow, rate-measuring device body in contact with the fluid to be measured are formed to be symmetrical on both sides of a face passing through the center axis of the flow rate-measuring passage and crossing a side wall of the flow rate-measuring device body at right angles.

As a result, unevenness disappears from a flow resistance at least in a direction of both sides of a column consisting of the flow rate-measuring device body, and the flow velocity distribution becomes uniform. Consequently, the quantity of the flow containing a drift is measured with less error.

DESCRIPTION OF THE PREFERRED EMBODIMENTS

Embodiment 1

Figure 1:
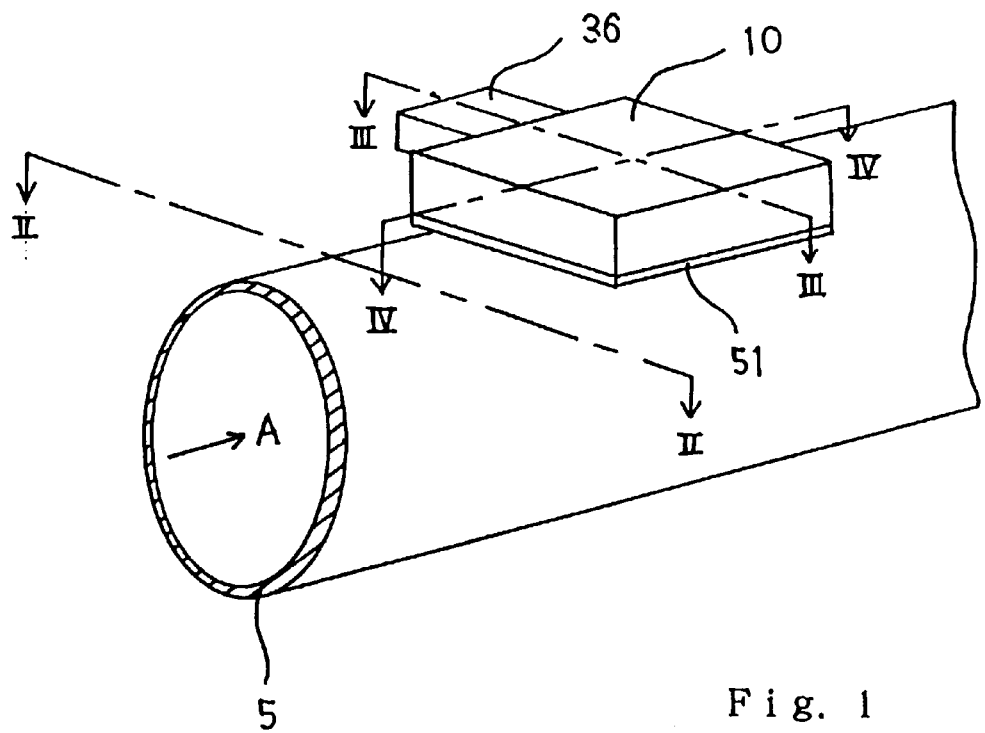
FIG. 1 is a partially perspective view of a duct where a flow rate-measuring device according to Embodiment 1 is mounted.
Figure 2:
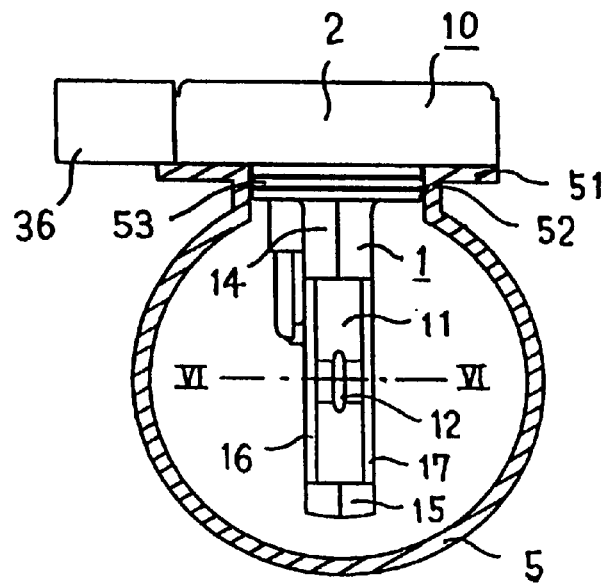
FIG. 2 is a front view of Embodiment 1 viewed from a cross section taken along the line II—II of FIG. 1 in the direction of the arrow A.
Figure 3:
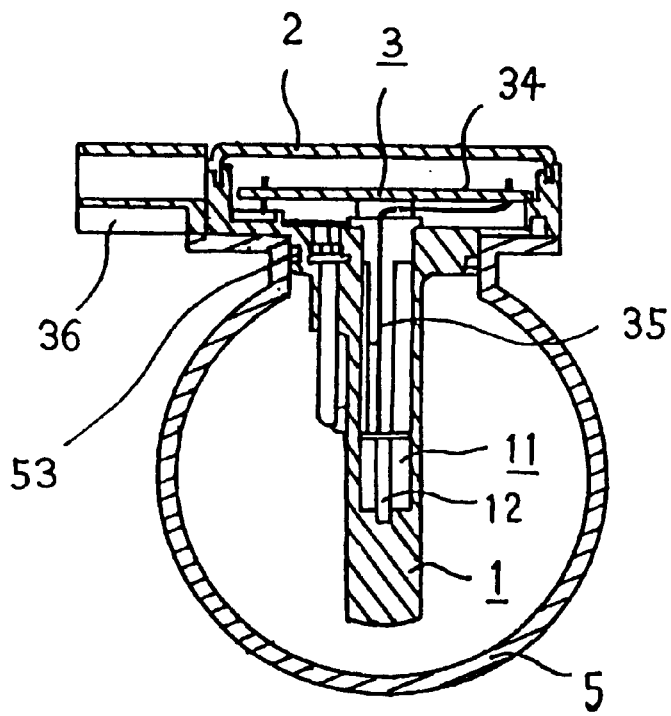
FIG. 3 is a sectional view taken along the line III—III of FIG. 1.
Figure 4:
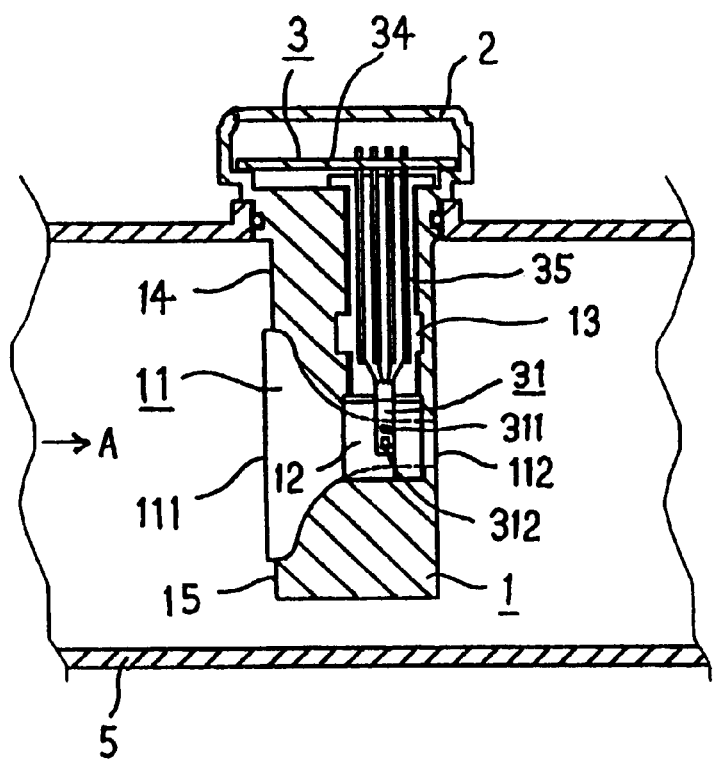
FIG. 4 is a sectional view taken along the line IV—IV of FIG. 1.
Figure 5:
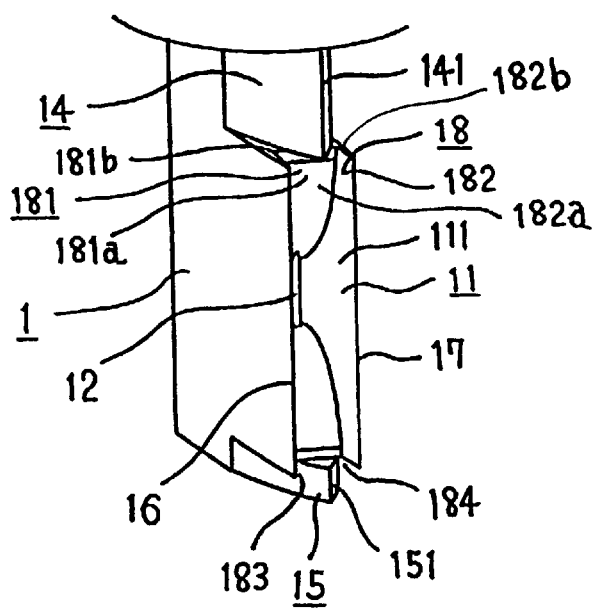
FIG. 5 is a partially perspective view of Embodiment 1.
Figure 6:
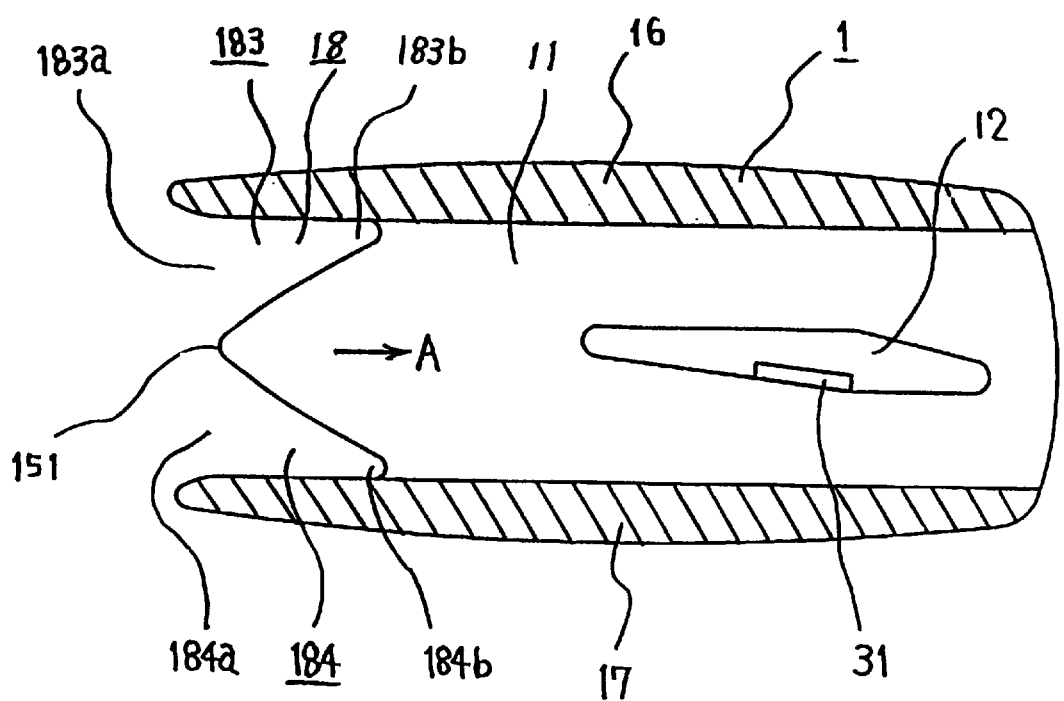
FIG. 6 is a sectional view taken along the line VI—VI of FIG. 2.

FIGS. 1 to 6 are to explain a flow rate-measuring device according to Embodiment 1 of the invention. FIG. 1 is a partially perspective view of a duct where the flow rate-measuring device according to Embodiment 1 is mounted, and FIG. 2 is a front elevation viewed from a cross section taken along the line II—II of FIG. 1 from the direction of the arrow A. FIG. 3 is a sectional view taken along the line III—III of FIG. 1, and FIG. 4 is a sectional view taken along the line IV—IV of FIG. 1. FIG. 5 is a partially perspective view, and FIG. 6 is a sectional view taken along the line VI—VI of FIG. 2.

Referring to FIGS. 1 and 2, a flow rate-measuring device 10 is inserted, together with an O ring 53 for airtight sealing, into an insertion hole 52 of a pedestal 51 formed on a duct 5 where fluid to be measured flows and is hermetically attached to the duct 5. Referring to FIGS. 2 to 6, the flow rate-measuring device 10 is generally comprised of a substantially columnar flow rate-measuring device body 1, a circuit substrate accommodation case 2, and an electric member 3 formeasuring the flow rate. The circuit substrate accommodation case 2 is mounted with a connector 36 and is connected to the flow rate-measuring device body 1. The circuit substrate accommodation case 2 is fixed on the pedestal 51 with a bolt (not shown) and functions to hold the flow rate-measuring device body 1 in the duct 5.

The flow rate-measuring device body 1 is comprised of a flow rate-measuring passage 11 for taking in and letting flow a part of the fluid to be measured, an electric element holding member 12, and a terminal holding member 13. The electric element holding member 12 is fixed to an end portion of the terminal holding member 13. As shown in FIG. 6, the electric element holding member 12 is a plate-like member of which middle portion is slightly thicker than both ends in the flow direction of the fluid to be measured. The electric element holding member 12 is kept with a part of the electric element holding member 12 exposed in the flow rate-measuring passage 11 at a short distance upstream from the outlet 112 of the flow rate-measuring passage 11. A flow rate-detecting element 31 is mounted on the surface of the foregoing exposed portion of the electric element holding member 12. The electric element holding member 12 is disposed in the flow rate-measuring passage 11 in such a manner as to be slightly inclined with respect to side walls 16, 17 of the flow rate-measuring device body 1 forming the flow rate-measuring passage 11, i.e., with an inclination downward from the left end to the right end in FIG. 6. Thus, the flow rate-detecting element 31 is mounted on the surface on the lower side (in FIG. 6) of the electric element holding member 12. As a result of such arrangement of the electric element holding member 12 and the flow rate-detecting element 31, the fluid to be measured flowing in the direction of the arrow A satisfactorily contacts the flow rate-detecting element 31. It is also preferable that the electric element holding member 12 and the terminal holding member 13 are integrally constructed with a resin or the like.

The flow rate-detecting element 31 is comprised of a flow rate-detecting resistance 311 and a temperature-compensating resistance 312 formed by using an electrical insulator such as silicon or ceramic as a substrate and patterning a platinum film on the surface. As for the flow rate-detecting element 31 and the flow rate-detecting resistance 311, the temperature-compensating resistance 312, etc. forming the flow rate-detecting element 31, it is also possible to use those conventionally known in the art or those actually put into practical use. For example, it is preferable that the flow rate-detecting resistance 311 is composed of a material such as nickel or permalloy. The temperature-compensating resistance 312 is not necessarily mounted on the flow rate-detecting element 31, but the temperature-compensating, resistance 312 can be disposed near the flow rate-detecting element 31. In a case where the temperature-compensating resistance 312 is mounted on the fllow rate-detecting element 31, it is preferable to dispose insulating means such as air gap or the like between the temperature-compensating resistance 312 and the flow rate-detecting resistance 311.

The electric member 3 is comprised of a circuit substrate 34 accommodated in the circuit substrate accommodation case 2, the mentioned flow rate-detecting element 31, a terminal 35, and the connector 36. The flow rate-detecting element 31 is electrically connected to the circuit substrate 34 through the terminal 35, and the circuit substrate 34 is electrically connected to the connector 36. The flow rate-detecting element 31 is operated by electric power supplied through the connector 36. The flow rate of the fluid to be measured detected by the flow rate-detecting element 31 is transformed into an electric signal, and is inputted via the circuit substrate 34 to a receiver outside (not shown).

The flow rate-measuring device body 1 is columnar and each of the faces, where an inlet 111 and the outlet 112 of the flow rate-measuring passage 11 are opened, is rectangularor the like. The flow rate-measuring device body 1 has upper and lower convection faces 14, 15 opposed to the flow (the arrow A) of the fluid to be measured. As shown in FIGS. 5 and 6, the upper and lower convection faces 14, 15 are provided with tip end portions 141, 151 formed in the middle of each convection face in width direction with their width gradually increased from the tip end portions to form a streamline. That is, each of the convection faces is formed like a bow. The inlet 111 of the flow rate-measuring passage 11 is formed between these upper and lower convection faces 14, 15 by the side walls 16, 17 and the convection faces 14, 15 of the flowrate-measuring device body 1. The flow rate-measuring passage 11 has the inlet 111 and the outlet 112 opening on the rear side of the convection faces. The opening area of the flow rate-measuring passage 11 decreases simply from the inlet 111 to the vicinity of the place where the flow rate-detecting element 31 is disposed, and is substantially constant on the downstream side therefrom to the outlet 112. The opening of the inlet 111 is rectangular, while the outlet 112 is square. The flow rate-measuring device body 1 is attached to the duct 5 so that a center axis of the flow rate-measuring passage 11 may be substantially coincident to the center of the duct 5.

The flow rate-measuring passage 11 has a leak flow passage 18. The leak flow passage 18 consists of leak flow passage portions 181, 182, 183, and 184 arranged at the four corners of the inlet 111 of the flow rate-measuring passage 11 respectively. These leak flow passage portions 181 to 184 have inflow ports 181a to 184a and discharge ports 181b to 184b respectively. Each of the inflow ports 181a to 184a is a part of the inlet 111. The discharge ports 181b to 184b are respectively located on the upstream side from the portion where the flow rate-detecting element 31 is arranged. Each of the leak flow passage portions 181 to 184 isformed so that the opening area in a direction crossing a center axis of each leak flow passage portion at right angles may gradually decrease from the inflow port to the discharge port. For the sake of simplicity of the drawing, the positions of the inflow port 181a and the discharge port 181b of only the leak flow passage portion 181 among the leak flow passage portions 181 to 184 are shown in FIG. 5. FIG. 6 shows the positions of the inflow ports 183a, 184a and the discharge ports 183b, 184b of the leak flow passage portions 183 and 184.

In this Embodiment 1, the portions of the flow rate-measuring device body 1 contacting the fluid to be measured, especially the flow rate-measuring passage 11, the inlet 111, the outlet 112, the leak flow passage 18, the convection faces 14, 15, the side walls 16, 17, etc. are arranged so as to be symmetrical about a face passing through the center axis of the flow rate-measuring passage 11 and being parallel to the side walls 16, 17 of the mentioned flow rate-measuring device body 1. This symmetry is advantageous in view of improving rectification of the flow of the fluid to be measured flowing in the flow rate-measuring passage 11. It is also advantageous that the foregoing respective portions of the flow rate-measuring device body 1 contacting the fluid to be measured are formed to be vertically symmetrical about a face passing through the center axis of the flow rate-measuring passage 11 and crossing theside walls 16, 17 of the flow rate-measuring device body 1 at right angles. As a result of employing such vertical, unevenness disappears from a flow resistance at least in the direction of the both sides of the columnar body consisting the flow rate-measuring device body 1. Thus the flow velocity distribution becomes uniform, and consequently, the quantity of the flow containing a drift is measured with less error.

The flow rate-measuring device 10 of Embodiment 1 of above-described construction renders favorable actions as described below. In the fluid to be measured having flown in from the inlet 111 of the flow rate-measuring passage 11, a flow flown in the center of the flow rate-measuring passage 11 or its vicinity as indicated by the arrow B in FIG. 17 flows toward the outlet 112. Then, the flow is discharged from the outlet 112 to the outside of the flow rate-measuring passage 11 in the same manner as in the conventional art. In this action, most of the fluid to be measured flown in the ends of the inlet 111 does not flow backward unlike the flow of the arrow C shown in FIG. 17, but passes through the leak flow passage portions 181 to 184. The flow is then discharged from the respective discharge ports 181b to 184b to the outside of the flow rate-measuring passage 11. Accordingly, in the flow rate-measuring device according to Embodiment 1, a back flow occurring in the conventional example does not substantially takes place, or at least the backflow rate is reduced. Therefore, the flow rate-measuring passage 11 effectively performs the rectification action based on the contraction flow as described above. As a result, the flow rate is measured with less error as compared with the conventional example.

Figure 16:
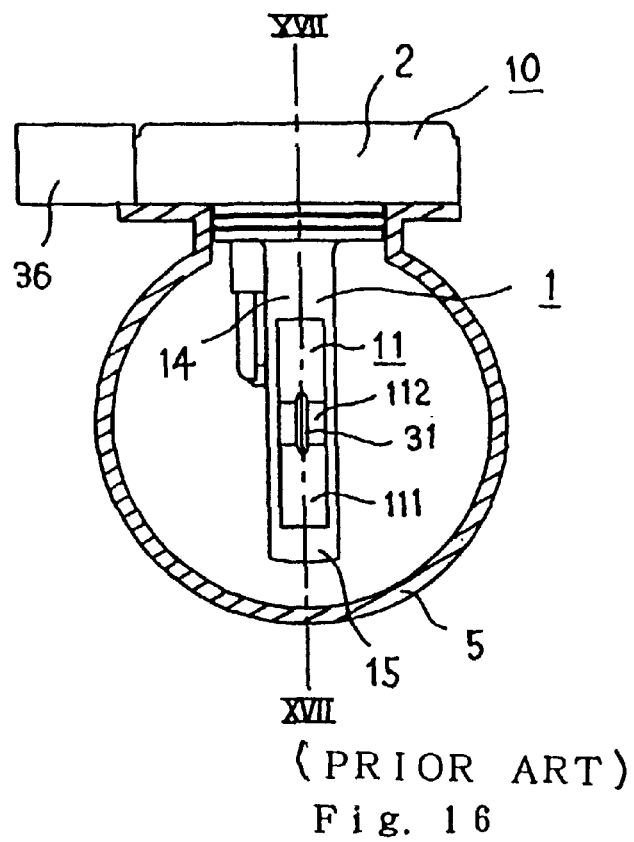
FIG. 16 is a front view of a flow rate-measuring device. disclosed in the prior application art.

In the invention, it is not always necessary that the convection faces 14, 15 of the flow rate-measuring device body 1 have bow-shaped configurations, but it is preferable that they have bow-shaped configurations from the following reasons. More specifically, if the convection faces 14, 15 are flat faces like those in the prior application art shown in FIGS. 16 and 17, the flat faces stem a part of the fluid to be measured coming from the upstream of the duct 5 and generate a stagnation point. This may disturb smooth flowing of the fluid to be measured into the flow rate-measuring passage 11. If the fluid to be measured is a pulsation flow, the mentioned stagnation point moves on the faces of the convection faces 14, 15 moment by moment. Consequently, a ratio of the flow flowing into the flow rate-measuring passage 11 to the flow not flowing therein but flowing to the outside of the flow rate-measuring device body 1 becomes unstable and different from the ratio in the steady state.

Measurement of the flow rate by the flow rate-measuring device 10 is based on a calculation in terms of flow rate from the mutual relation between the flow rate calibrated in a steady flow and the detection signal detected by the flow rate-detecting element 31. Therefore an error occurs in the flow rate measurement when a steady flow is not formed. To cope with this problem incidental to the prior art, when the convection faces 14, 15 are bow-shaped, the mentioned stemming and stagnation point caused by stemming do not take place. As a result, the steady flow is secured and the flow rate is measured with less error.

Embodiment 2

Figure 7:
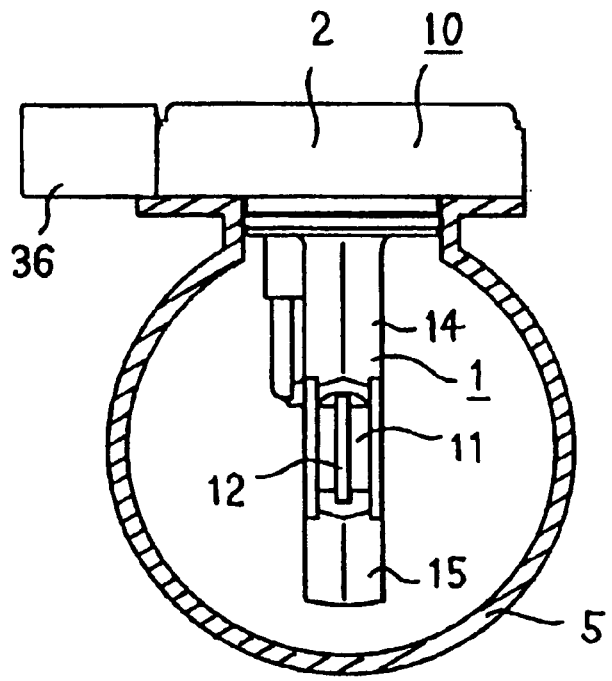
FIG. 7 is a front view of Embodiment 2 corresponding to FIG. 2 of Embodiment 1.
Figure 8:
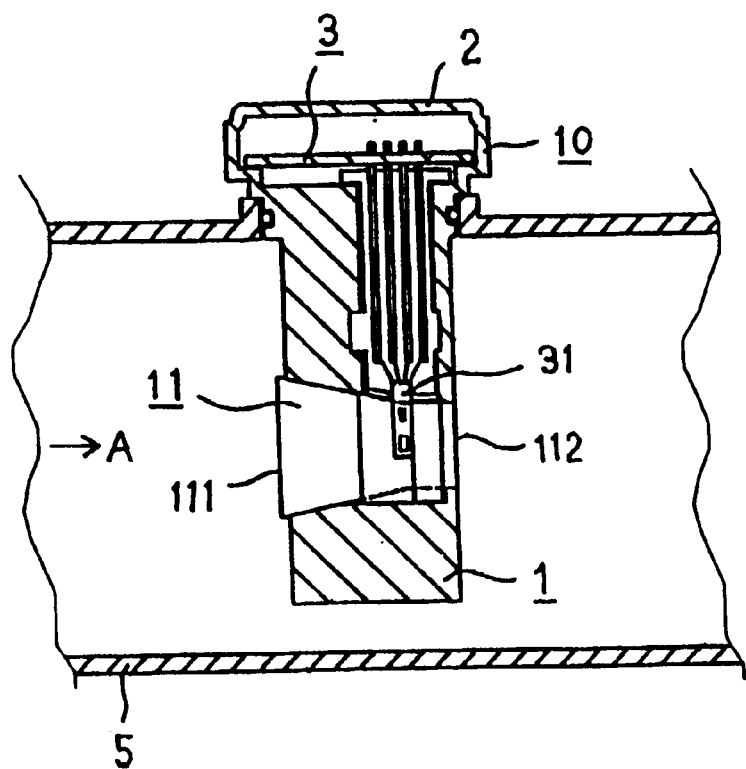
FIG. 8 is a sectional view of Embodiment 2 corresponding to FIG. 4 of Embodiment 1.
Figure 9:
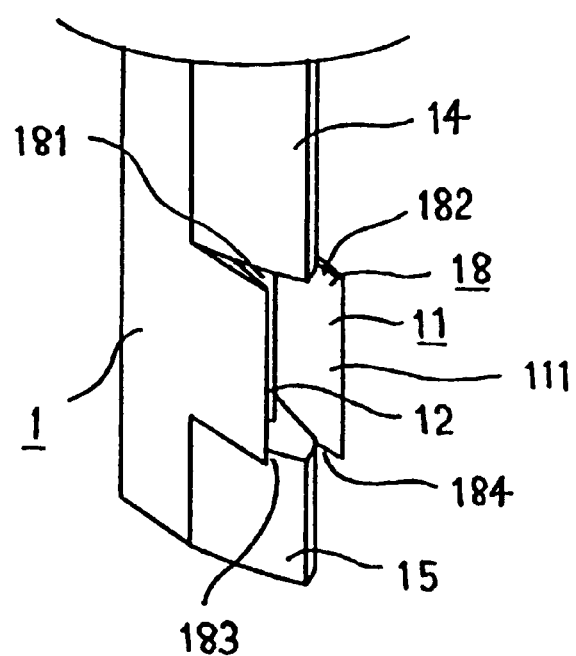
FIG. 9 is a partially perspective view of a flow rate-measuring device according to Embodiment 2.
Figure 10:
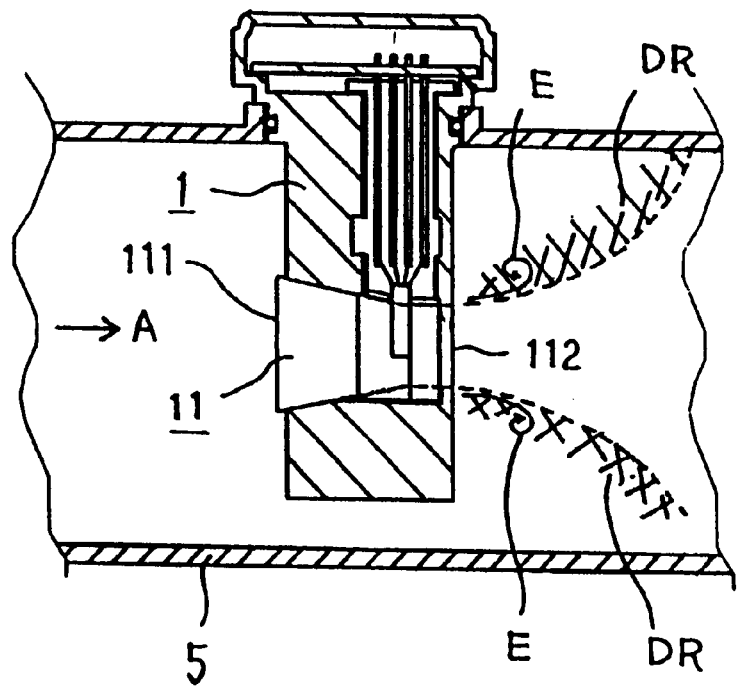
FIG. 10 is a sectional view of Embodiment 2 corresponding to FIG. 4 of Embodiment 1.
Figure 11:
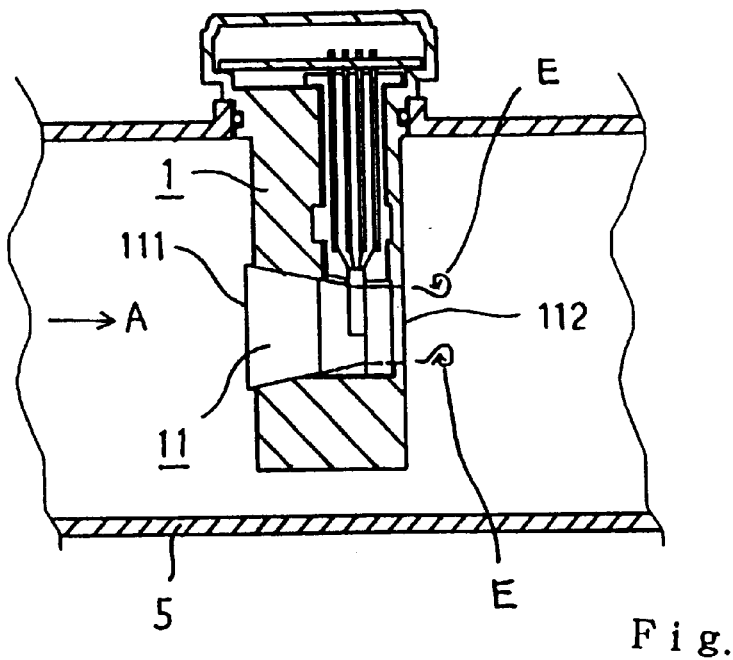
FIG. 11 is a sectional view of Embodiment 2 corresponding to FIG. 4 of Embodiment 1.
Figure 12:
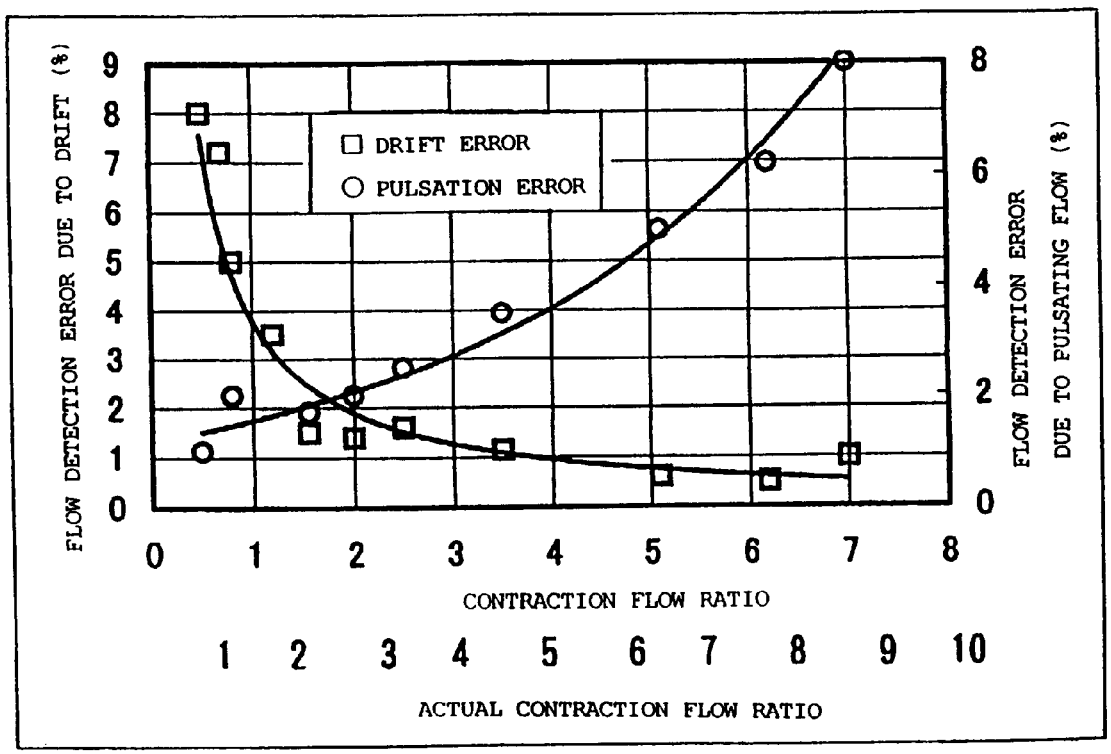
FIG. 12 is a graph showing flow-measuring performance of Embodiment 2.
Figure 13:
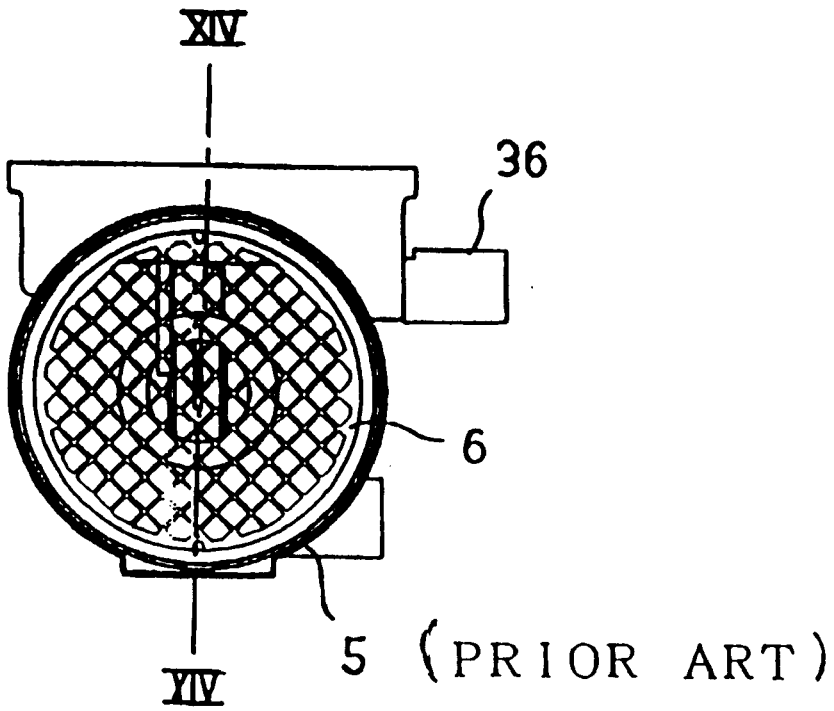
FIG. 13 is a front view of a flow rate-measuring device according to the prior art.
Figure 14:
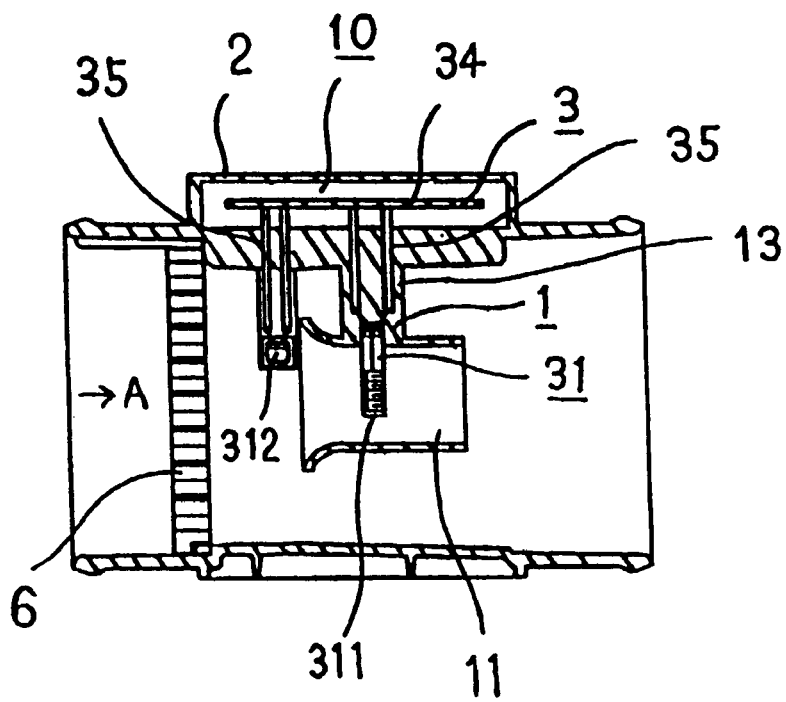
FIG. 14 is a sectional view taken along the line XIV—XIV of FIG. 13.
Figure 15:
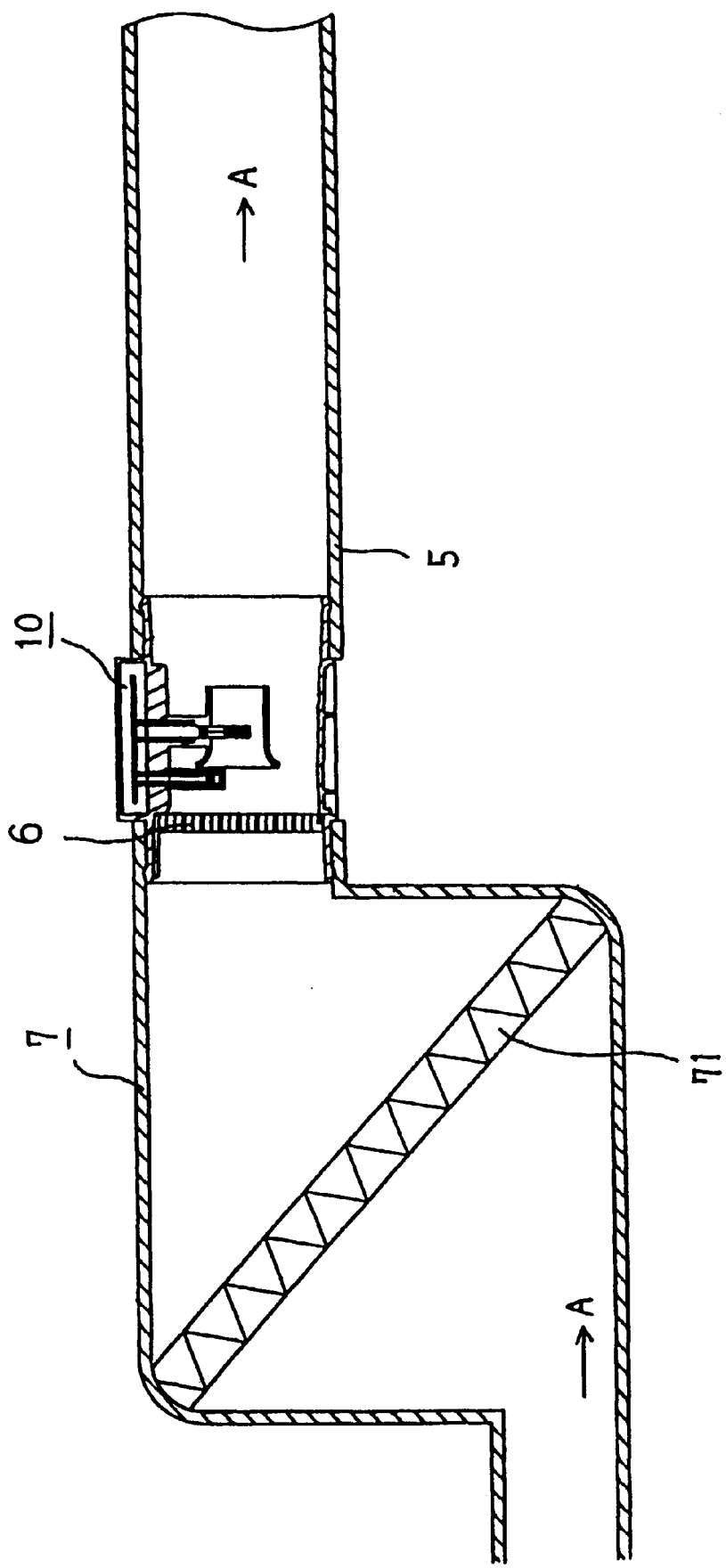
FIG. 15 is a sectional view of an example of a pipe system to which the flow rate-measuring device according to the prior art is attached.

FIGS. 7 to 12 are to explain a flow rate-measuring device according to Embodiment 2 of the invention. FIG. 7 is a front view of Embodiment 2 corresponding to FIG. 2 in Embodiment 1. Each of FIG. 8, FIG. 10, and FIG. 11 is a sectional view of Embodiment 2 corresponding to FIG. 4 in Embodiment 1. FIG. 9 is a partially perspective view of Embodiment 2. FIG. 12 is a graph of flow rate-measuring performance of this Embodiment 2. In FIGS. 10 and 11, E indicates eddy and DR indicates a dead water region.

This Embodiment 2 is different from Embodiment 1 in the aspect that the opening area of the inlet 111 of the flow rate-measuring passage 11 is established to be 1.3 to 3 times as large as the opening area of the outlet 112 thereof. Rest of the construction of Embodiment 2 is the same as that of Embodiment 1. Length of the sides of the outlet 112 of the flow rate-measuring passage 11 extending in the direction of the long sides of the face, where the outlet 112 is opened, of the flow rate-measuring device body 1 is larger than the short sides of the foregoing face, though not mentioned in Embodiment 1. The flow rate-measuring device of Embodiment 2 of above construction performs several advantages described below in addition to the foregoing effects achieved in Embodiment 1.

The fluid to be measured often pulsates due to acceleration or deceleration of the engine, and FIG. 10 schematically shows the state of the flow of the fluid to be measured behind the outlet 112 of the flow rate-measuring passage 11 when the engine is accelerated. FIG. 1 schematically shows the manner of flow of the fluid to be measured behind the outlet 112 of the flow rate-measuring passage 11 when the engine is decelerated. As shown in FIG. 10, when the engine is accelerated, the flow separated from the rear face of the flow rate-measuring device body 1 may, flow into dead water regions DR generated behind the outlet 112, whereby eddies E are generated in some cases. Such eddies E are pushed back to the vicinity of the outlet 112 when the engine is decelerated, as shown in FIG. 11. Being formed on the rear face of the flow rate-measuring device body 1, the eddies E are smaller than the width of the foregoing rear face. As the outlet 112 in Embodiment 2 in vertical direction is longer than the width of the flow rate-measuring device body 1, the outlet 112 cannot be blocked by the eddies E. As a result, in the flow rate-measuring device 10 of Embodiment 2, even a big pulsation flow does not cause any problem of decreasing the flow velocity of the fluid to be measured in the vicinity of the flow rate-detecting element 31. Thus it is possible to measure the flow rate with less error.

FIG. 12 shows results of measurement of the flow rate detection error based on pulsation of the fluid to be measured with respect to the opening area ratio of the inlet 111 to the outlet 112 of the flow rate-measuring passage 11 (hereinafter referred to as the contraction flow ratio). FIG. 12 also shows results of measurement of the flow rate detection error based on a drift generated when the air cleaner element is plugged. In FIG. 12, actual contraction flow ratio in the axis of abscissas means an opening area ratio of the inlet 111 to the outlet 112. The opening areas are obtained by subtracting the projected area of the electric element holding member 12 mounted with the flow rate-detecting element 31 in the flow direction of the fluid to be measured indicated by the arrow A from each opening area of the inlet 111 and the outlet 112.

It is clearly understood from FIG. 12 that reducing the contraction flow ratio can decrease the flow rate detection error based on pulsation, but that the flow rate detection error based on the drift is increased. However, note that when the contraction flow ratio is in the range of 1.3 to 3% (2 to 4% in the actual contraction flow ratio), both of the foregoing errors are restrained to not more than 3%. As described above, in this Embodiment 2, the opening area ratio or the contraction flow ratio is established to be an appropriate ratio. Therefore, influence of eddies generated behind the outlet 112 when the engine is accelerated as well as influence of a drift caused by the plugged air cleaner element can be restrained to the minimum, and the flow rate of the fluid to be measured is measured with less error.

The invention is not limited to the foregoing Embodiments 1 and 2, but includes various changes and modifications as described below. First, the opening of the inlet of the flow rate-measuring passage can be rectangular with its four cornets rounded off, a square, a square with its four corners rounded off, a circle, or an oval instead of being rectangular. The opening of the outlet can be any of the various configurations in the same manner as the opening of the inlet. The opening of the inlet and that of the outlet can be similar to each other, and it is also preferable that they are different from each other.

Figure 17:
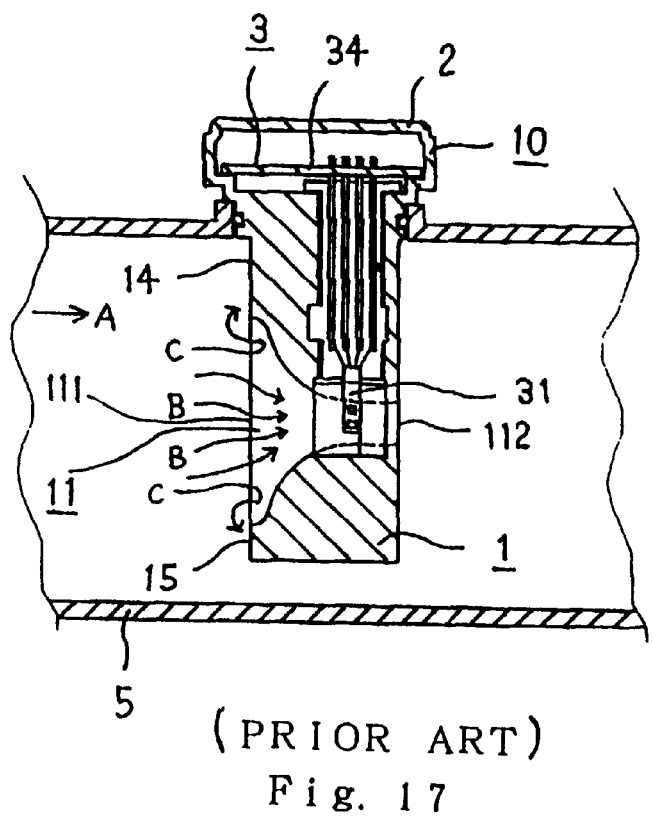
FIG. 17 is a sectional view taken along the line XVII—XVII of FIG. 16.

As described above, the leak flow passage serves to reduce the quantity of the backflow components as indicated by the arrow C shown in FIG. 17. Therefore, instead of providing a leak flow passage portion at each of the four corners of the inlet 111 of the flow rate-measuring passage 11 as shown in FIGS. 5 and 9, it is also preferable that the leak flow passage portions are provided at only the upper or corners of the inlet 111.

In general, changing the opening area of the flow rate-measuring passage is satisfactory as far as the opening area gradually decreases at least in the upstream region communicating to the inlet of the flow rate-measuring passage in the flow rate-measuring passage, particularly in the territory from the inlet of the flow rate-measuring passage to the vicinity of the middle portion of the above-mentioned inlet and the outlet. It is also preferable that the opening area in the mentioned territory decreases simply or has an inflection point as illustrated in the prior application art. It is also preferable that the opening area gradually decreases simply or decreases with an inflection point from the inlet to the outlet of the flow rate-measuring passage.

What is claimed is:

1. A flow rate-measuring device comprising:
   a flow rate-measuring device body having a flow rate-measuring passage for measuring a flow rate of a fluid to be measured;
   a flow rate-detecting element disposed in said flow rate-measuring passage; and
   a leak flow passage;
   wherein a part of an inlet of said flow rate-measuring passage forms a leak flow passage inlet; and
   wherein said leak flow passage is adapted to discharge the fluid to be measured, which has flowed in from said leak flow passage inlet, out of said flow rate-measuring passage at a portion of said flow rate-measuring passage located upstream from an outlet of said flow rate-measuring passage.

2. The flow rate-measuring device according to claim 1, wherein an opening area in a direction crossing a center axis of said flow rate-measuring passage at right angles in said flow rate-measuring passage, at least in an upstream region communicating to the inlet of the flow rate-measuring passage, gradually decreases from the upstream to the downstream of said flow rate-measuring passage.

3. A. The flow rate-measuring device according to claim 2, wherein the opening area of the inlet of the flow rate-measuring passage is 1.3 to 3 times as large as the opening area of the outlet of said flow rate-measuring passage.

4. The flow rate-measuring device according to claim 1, wherein the flow rate-measuring device body is a columnar body in which each of faces of said flow rate-measuring device-body, where the inlet and the outlet of the flow rate-measuring passage are opened, is rectangular or almost rectangular.

5. The flow rate-measuring device according to claim 4, wherein sides of the outlet of said flow rate-measuring-passage extending in a direction of long sides of the face, where said outlet is opened, of the flow rate-measuring device body are longer than short sides of said face.

6. The flow rate-measuring device according to claim 1, wherein the flow rate-measuring device body is disposed in a duct of the fluid to be measured so that a center axis of said flow rate-measuring passage may be substantially coincident to a center axis of the duct, and at least a part of convection faces opposed to the flow of said fluid to be measured of the flow rate-measuring device body is streamlined to reduce a flow resistance of said fluid to be measured.

7. The flow rate-measuring device according to claim 1, wherein the inlet of said leak flow passage is located at an end portion of the inlet of the flow rate-measuring passage, and an outlet of said leak flow passage is located upstream from a portion where the flow rate-detecting element is disposed.

8. The flow rate-measuring device according to claim 1, wherein an opening area of the leak flow passage in a direction crossing a center axis of said leak flow passage at right angles gradually decreases from said inlet to said outlet.

9. The flow rate-measuring device according to claim 1, wherein portions of the flow rate-measuring device body in contact with the fluid to be measured are formed to be symmetrical on both sides of a face passing through the center axis of the flow rate-measuring passage and crossing a side wall of said flow rate-measuring device body at right angles.

10. A flow rate-measuring device comprising:
    a flow rate-measuring device body having a flow rate-measuring passage for measuring a flow rate of a fluid to be measured;
    a flow rate-detecting element disposed in said flow rate-measuring passage; and
    a leak flow passage;
    wherein a part of an inlet of said flow rate-measuring passage forms a leak flow passage inlet;
    wherein said leak flow passage is adapted to discharge the fluid to be measured, which has flowed in from said leak flow passage inlet, out of said flow rate-measuring passage at a portion of said flow rate-measuring passage located upstream from an outlet of said flow rate-measuring passage, and
    wherein an opening area in a direction crossing a center axis of said flow rate-measuring passage at right angles in said flow rate-measuring passage, at least in an upstream region communicating to said inlet of the flow rate-measuring passage, gradually decreases from the upstream to the downstream of said flow rate-measuring passage.

11. The flow rate-measuring device according to claim 10, wherein the opening area of the inlet of the flow rate-measuring passage is 1.3 to 3 times as large as the opening area of the outlet of said flow rate-measuring passage.

12. The flow rate-measuring device according to claim 10, wherein the flow rate-measuring device body is a columnar body in which each of faces of said flow rate-measuring device body, where the inlet and the outlet of the flow rate-measuring passage are opened, is rectangular or almost rectangular.

13. The flow rate-measuring device according to claim 12, wherein sides of the outlet of said flow rate-measuring passage extending in a direction of long sides of the face, where said outlet is opened, of the flow rate-measuring device body are longer than short sides of said face.

14. The flow rate-measuring device according to claim 10, wherein the flow rate-measuring device body is disposed in a duct of the fluid to be measured so that a center axis of said flow rate-measuring passage may be substantially coincident to a center axis of the duct, and at least a part of convection faces opposed to the flow of said fluid to be measured of the flow rate-measuring device body is streamlined to reduce a flow resistance of said fluid to be measured.

15. The flow rate-measuring device according to claim 10, wherein the inlet of said leak flow passage is located at an end portion of the inlet of the flow rate-measuring passage, and an outlet of said leak flow passage is located upstream from a portion where the flow rate-detecting element is disposed.

16. The flow rate-measuring device according to claim 10, wherein an opening area of the leak flow passage in a direction crossing a center axis of said leak flow passage at right angles gradually decreases from said inlet to said outlet.

17. The flow rate-measuring device according to claim 10, wherein portions of the flow rate-measuring device body in contact with the fluid to be measured are formed to be symmetrical on both sides of a face passing through the center axis of the flow rate-measuring passage and crossing a side wall of said flow rate-measuring device body at right angles.

* * * * *